United States Patent
Zhou et al.

(10) Patent No.: US 12,368,976 B1
(45) Date of Patent: Jul. 22, 2025

(54) LIQUID CRYSTAL ON SILICON FOR MULTIPLE CHARGE-COUPLED DEVICE CAMERA ALIGNMENT

(71) Applicant: MLOptic Corp, Redmond, WA (US)

(72) Inventors: Wei Zhou, Sammamish, WA (US); Kaizhang Fan, Seattle, WA (US); Ying-Ju Chu, Redmond, WA (US)

(73) Assignee: MLOptic Corp., Redmond, WA (US)

(*) Notice: Subject to any disclaimer, the term of this patent is extended or adjusted under 35 U.S.C. 154(b) by 0 days.

(21) Appl. No.: 19/202,149

(22) Filed: May 8, 2025

(51) Int. Cl.
| | | |
|---|---|---|
| H04N 5/225 | (2006.01) | |
| H04N 17/00 | (2006.01) | |
| H04N 23/55 | (2023.01) | |
| H04N 25/75 | (2023.01) | |

(52) U.S. Cl.
CPC ............. *H04N 25/75* (2023.01); *H04N 17/00* (2013.01); *H04N 23/55* (2023.01)

(58) Field of Classification Search
CPC ........ H04N 25/75; H04N 5/225; H04N 23/55; H04N 17/00
USPC ...................................................... 348/180
See application file for complete search history.

(56) References Cited

U.S. PATENT DOCUMENTS

| | | | | |
|---|---|---|---|---|
| 7,724,297 | B2* | 5/2010 | Nakabe | H04N 23/667 |
| | | | | 348/335 |
| 10,142,533 | B2* | 11/2018 | Kuo | H04N 23/63 |
| 10,389,993 | B2* | 8/2019 | Macmillan | H04N 23/698 |
| 10,819,926 | B2* | 10/2020 | Aggarwal | H04N 25/589 |
| 11,637,974 | B2* | 4/2023 | Kiser | G02B 27/108 |
| | | | | 348/262 |
| 12,069,357 | B2* | 8/2024 | Tian | H04N 23/687 |
| 2003/0151685 | A1* | 8/2003 | Ia Grone | H04N 23/16 |
| | | | | 348/262 |
| 2005/0179807 | A1* | 8/2005 | Lin | H04N 23/45 |
| | | | | 348/262 |
| 2009/0207411 | A1* | 8/2009 | Oakley | G03B 33/12 |
| | | | | 356/400 |

* cited by examiner

*Primary Examiner* — Trang U Tran
(74) *Attorney, Agent, or Firm* — Jong Patent Firm; Cheng Ning Jong; Tracy P. Jong

(57) ABSTRACT

A method for verifying alignment of image sensors of a CCD camera, the method including casting a collimated light source through an LCOS controlled to be disposed in a first pattern, onto the image sensors to form a second pattern on each of the image sensors, the LCOS disposed between a collimated light source and the CCD camera, frame-differencing the first pattern with the second pattern of each of the image sensors to result in a differencing result for each of the image sensors, and adjusting at least one of an orientation and a position of one of the image sensors if the differencing result for the one of the image sensors is non-zero, to result in an optical mapping of pixel cells of the LCOS and pixel cells of each of the image sensors.

16 Claims, 10 Drawing Sheets

LIQUID CRYSTAL ON SILICON FOR MULTIPLE CHARGE-COUPLED DEVICE CAMERA ALIGNMENT

BACKGROUND OF THE INVENTION

1. The Field of the Invention

The present invention relates to a device and a method useful for aligning a charge-coupled device (CCD) of a camera. More specifically, the present invention is directed to a device and a method useful for aligning CCDs of a 3CCD camera.

2. Background Art

A 3CCD camera is a type of digital camera or CCD camera that utilizes three charge-coupled devices (CCDs) to capture images. Each CCD in the camera is responsible for capturing light of a specific color, typically red, green, and blue (RGB), which are the primary colors used in digital imaging. In a 3CCD camera, light entering the camera's lens is split into its component colors using a prism or a beam splitter. Each color component is then directed onto a separate CCD sensor, which captures the intensity of light for that particular color. The three sets of color information are then combined to form a full-color image. These cameras are often used in professional video and photography applications where high color fidelity and image quality are required, such as in broadcasting, cinematography, and medical imaging. The use of three separate CCDs allows for more accurate color reproduction compared to single-CCD cameras, which use color filters to separate light into its component colors. However, If the three separate CCD sensors in a 3CCD camera are not properly aligned, it can result in several issues affecting image quality, e.g., color fringing, blurriness, image distortion and reduced resolution. Misalignment of corresponding pixel cells of the three separate CCD sensors can cause color fringing or color artifacts in the image, where colors do not align correctly, leading to distorted or inaccurate color representation. It can also result in blurred or out-of-focus images, as the individual color components may not converge properly to form a sharp image. Misalignment may lead to reduced sharpness, color aberrations, image distortion, where objects appear stretched, skewed, or otherwise deformed due to the different color components not aligning correctly and it can reduce the effective resolution of the camera, as the three-color components may not combine seamlessly to produce a high-resolution image.

Manufacturers typically employ calibration and alignment processes during the production of 3CCD cameras to ensure that the three CCD sensors are properly aligned. Additionally, some cameras may offer calibration features or adjustments that allow users to fine-tune the alignment if necessary. A custom lens is typically used in a traditional calibration and adjustment procedure of a 3CCD camera. However, a custom lens can be expensive to design and manufacture and a different lens may be needed for a different 3CCD camera. Additionally, a lens has a short depth of focus, making it difficult to focus on the sensors of a 3CCD camera. Achieving proper alignment between a custom lens and the 3CCD camera can be challenging as the beam diverges outside of the focal point of the lens. With only one beam at a time, the verification of multiple spots on the CCDs would require that a beam be moved and re-cast to the CCDs so that more than one sample is obtained to verify the alignment of the CCDs.

There exists a need for a device and/or a method that are more easily adapted to allow the CCDs of a 3CCD camera to be aligned in that the device and/or the method do not need to be customized for verifying the CCDs of the 3CCD camera.

SUMMARY OF THE INVENTION

In accordance with the present invention, there is provided a method for verifying alignment of a plurality of image sensors of a charge-coupled device (CCD) camera using a liquid crystal on silicon (LCOS), the LCOS including a pixel plane, wherein the pixel plane of the LCOS optically maps to a pixel plane of each of the plurality of image sensors, the method including:
(a) casting a collimated light source through the LCOS controlled to be disposed in a first pattern, onto the plurality of image sensors to form a second pattern on each of the plurality of image sensors, the LCOS disposed between the collimated light source and the CCD camera;
(b) frame-differencing the first pattern with the second pattern of each of the plurality of image sensors to result in a differencing result for each of the plurality of image sensors; and
(c) adjusting at least one of an orientation and a position of an image sensor of the plurality of image sensors if the differencing result for the image sensor of the plurality of image sensors is non-zero, to result in an optical mapping of the pixel plane of the LCOS and the pixel plane of each of the plurality of image sensors of the CCD camera.

In one embodiment, the LCOS is a transmissive LCOS, the transmissive LCOS includes a plurality of rows and a plurality of columns of pixel cells, the first pattern corresponds to a pattern of transmissivity of the pixel cells of the transmissive LCOS and at least two of the pixel cells of the transmissive LCOS are disposed in a transmissivity that is different from the transmissivity of the rest of the pixel cells of the transmissive LCOS. In one embodiment, the at least two of the pixel cells of the transmissive LCOS are disposed at different transmissivities. In one embodiment, the at least two of the pixel cells of the transmissive LCOS are separated up to a distance corresponding to the shorter of a first dimension of the plurality of rows of pixel cells and a second dimension of the plurality of columns of pixel cells.

In one embodiment, the LCOS is a reflective LCOS, the reflective LCOS including a plurality of rows and a plurality of columns of pixel cells, the first pattern corresponds to a pattern of reflectivity of the pixel cells of the reflective LCOS and at least two of the pixel cells of the reflective LCOS are disposed in a reflectivity that is different from the reflectivity of the rest of the pixel cells of the reflective LCOS. In one embodiment, the at least two of the pixel cells of the reflective LCOS are disposed at different levels of reflectivity. In one embodiment, the at least two of the pixel cells of the reflective LCOS are separated up to a distance corresponding to the shorter of a first dimension of the plurality of rows of pixel cells and a second dimension of the plurality of columns of pixel cells. In one embodiment, the LCOS includes a resolution of 1080p.

An object of the present invention is to provide a device and a method for aligning pixel cells of multiple image sensors of a 3CCD camera.

Another object of the present invention is to provide a cost-effective device and a method for aligning pixel cells of multiple image sensors of a 3CCD camera.

Another object of the present invention is to provide a method for aligning pixel cells of multiple image sensors of a 3CCD camera that is capable of casting multiple spots simultaneously to ensure alignment of the CCDs of the 3CCD camera.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST 2-3CCD camera
4-optics
6-red color channel charge-coupled device (CCD) or image sensor
8-green color channel CCD or image sensor
10-blue color channel CCD or image sensor
12-trichroic prism
14-transmissive liquid crystal on silicon (LCOS)
16-reflective liquid crystal on silicon (LCOS) of microelectromechanical systems (MEMS) mirrors
18-beam splitter
20-LCOS or MEMS controller
22-pixel cell
24-collimated light
26-incident light beam
28-reflected light beam
30-a or aperture size
32-L or aperture to detector or CCD distance
34-slit or aperture
36-screen
38-linear polarizer
40-focal point
42-plane
44-diffraction pattern of slit A
46-diffraction pattern of slit B
48-diffraction pattern of slit C
50-diffraction pattern of slit D
52-width of diffraction pattern of slit A
54-width of diffraction pattern of slit B
56-width of diffraction pattern of slit C
58-width of diffraction pattern of slit D
60-pixel cell
62-central axis of misaligned CCD frame
64-spot
66-spot
68-frame
70-spot
72-spot
74-frame after orientation correction Particular Advantages of the Invention The present method for correcting the misalignment of the charge-coupled devices (CCDs) of a 3CCD camera starts with the identification of a misalignment in each of the CCDs. A misalignment can be detected by casting one or more light beams through an LCOS which does not require the use of a custom lens or lens system which can be difficult and costly to implement due to the shallow depth of focus of the lens or lens system. Further, more than one light beam can be cast through an LCOS to allow the identification and verification of an orientational misalignment in addition to a positional misalignment.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Figure 1:
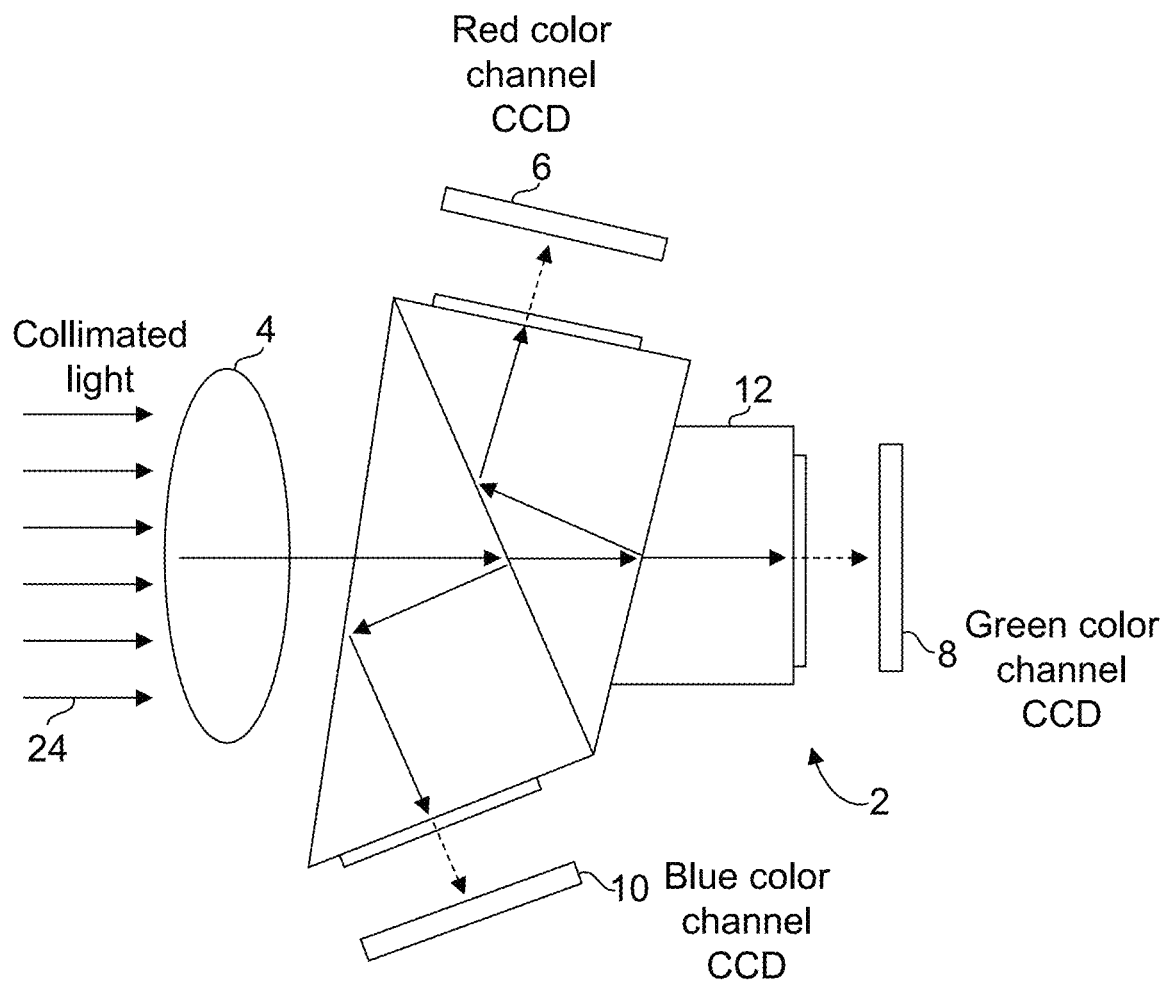
FIG. 1 is a diagram depicting a system for aligning charge-coupled devices (CCDs) of a 3CCD camera.
Figure 2:
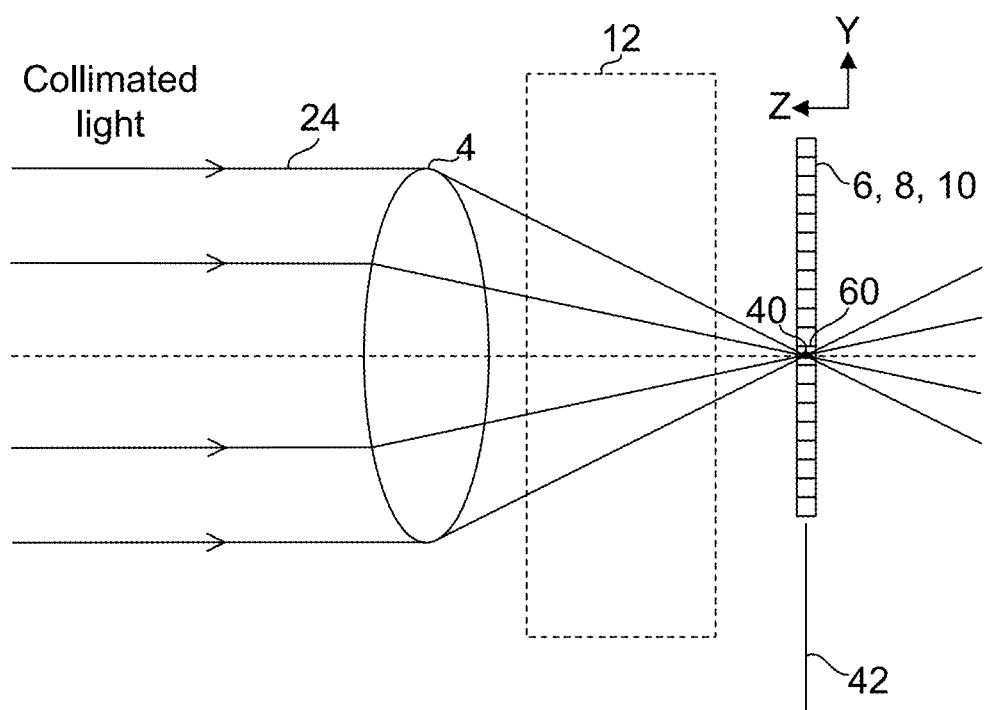
FIG. 2 is a simplified diagram depicting the difficulties associated with using the device shown in FIG. 1 in aligning the CCDs of the 3CCD camera.

FIG. 1 is a diagram depicting a system for aligning charge-coupled devices (CCDs) 6, 8, 10, one for each color channel of red, green and blue, of a 3CCD camera 2. A custom lens 4 or lens system disposed between collimated light rays 24 and the CCDs 6, 8, 10, is used to focus the light rays onto each of the CCDs 6, 8, 10 of the 3CCD camera 2. FIG. 2 is a simplified diagram depicting the difficulties associated with using the device shown in FIG. 1 in aligning the CCDs 6, 8, 10 of the 3CCD camera 2. The trichroic prism 12 which directs the incoming light rays into three different CCDs, is shown merely as a block. With a lens 4 or lens system, there is only a single plane at which the collimated light 24 is focused, i.e., plane 42, at which each of the CCDs 6, 8, 10 is adjusted to. It shall be seen that, if the lens 4 or lens system is adjusted to the left or to the right, the light rays would not be focused on pixel cell 60 but the focal point 40 would be at a point outside of plane 42, e.g., in front of plane 42 or behind plane 42, as the light rays or beam diverges quickly before and after the focal point 40 in the Z-direction. Therefore, as the depth of field of the lens 4 is short, there exists a very narrow band, within which the lens 4 shall be disposed to cause a focused spot to be cast on a pixel of each of the CCDs 6, 8, 10. It shall also be noted that only one spot can be cast at any time. Therefore, in order to verify the positioning and orientation of each CCD using multiple spots, the process of casting a light spot on a pixel would need to be repeated by adjusting the lens 4, which can be time-consuming. With only one light spot indicated at any one time, it would be impossible to indicate an orientational or rotational misalignment about the Z-axis. Further, it would be necessary to provide a customized lens or lens system to direct a beam to the CCDs for cameras, e.g., from different manufacturers.

Figure 3:
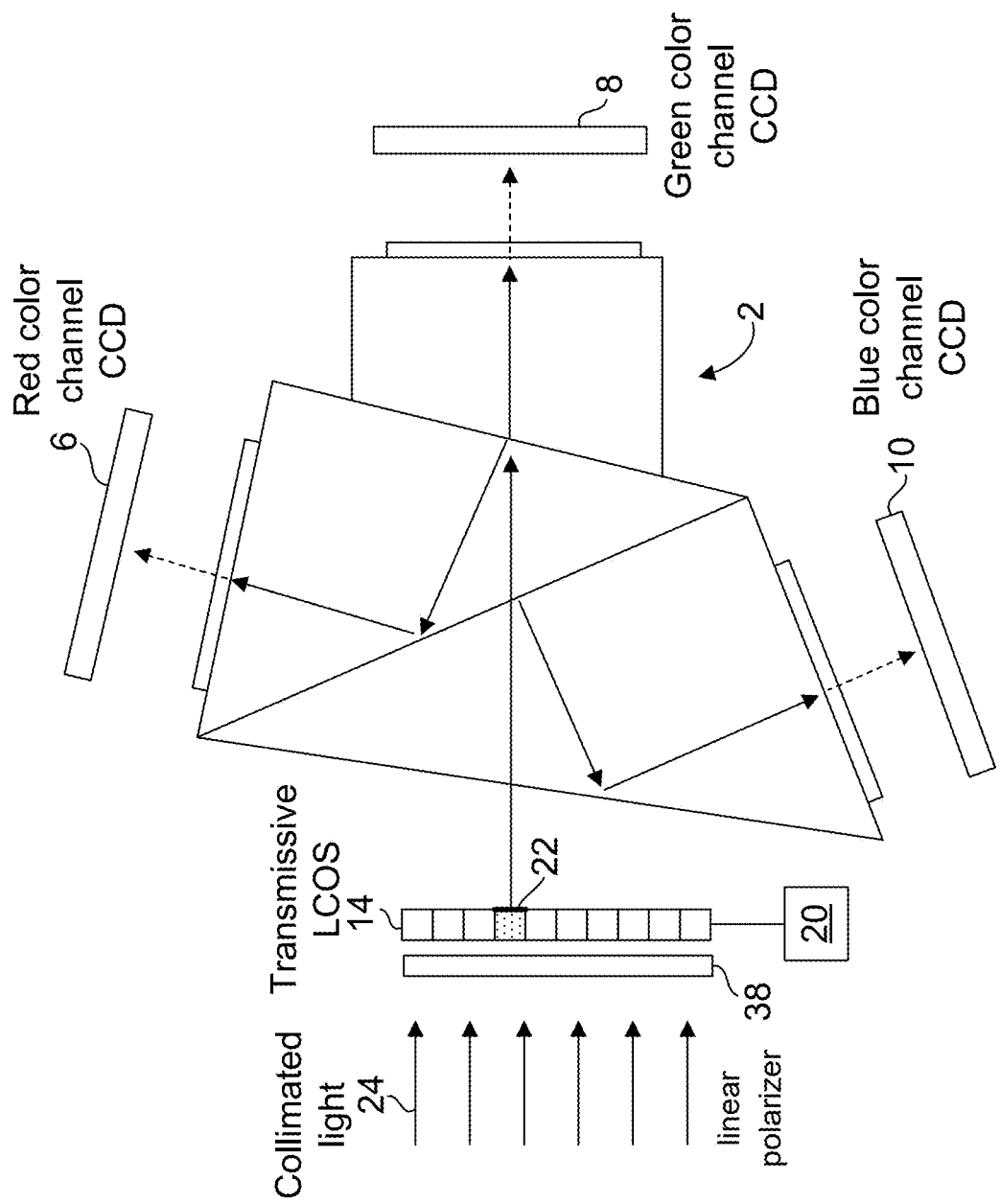
FIG. 3 is a diagram depicting a present system for aligning the CCDs of a 3CCD camera.
Figure 4:
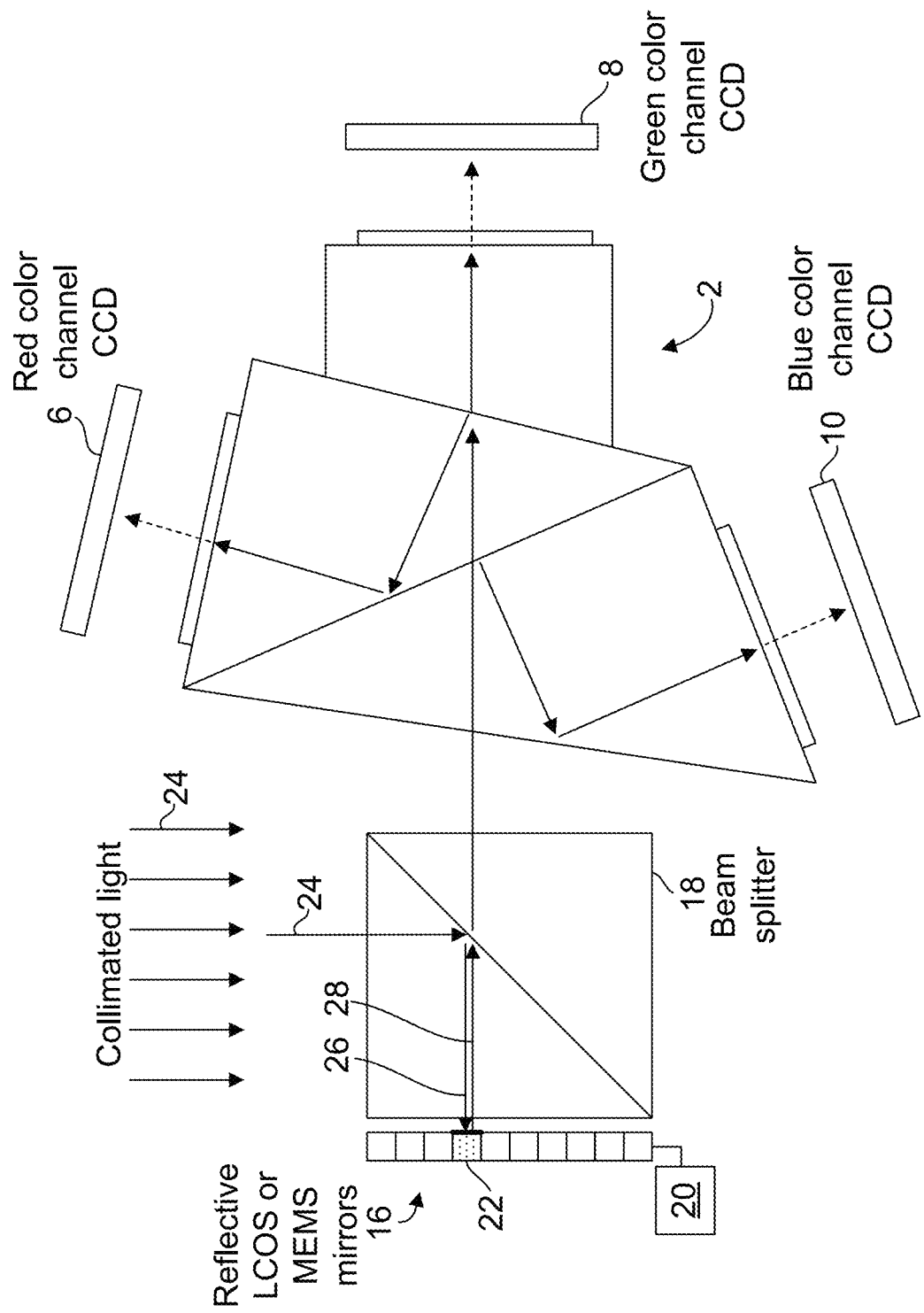
FIG. 4 is a diagram depicting a present system for aligning the CCDs of a 3CCD camera.

FIG. 3 is a diagram depicting a present system for aligning the CCDs 6, 8, 10 of a 3CCD camera 2. Shown herein is the use of a liquid crystal on silicon (LCOS) 14 to cast light rays to each CCD 6, 8, 10. In particular, the LCOS is a transmissive LCOS although a reflective LCOS or microelectromechanical (MEMS) mirrors may also be used as shown in FIG. 4. For a transmissive LCOS, the modulation state or transmissivity of each pixel can be individually controlled from a full transmission through partial transmissions to a total blockage of light rays. Therefore, for a full transmission, the transmissivity of each pixel of the LCOS is set to its highest value enabling full transmission of light rays to its corresponding pixel at a CCD. However, if reduced exposure of the corresponding pixel at the image sensor 6, 8, 10 is desired, the transmissivity of each pixel of the LCOS is set to a value lower than its maximum value.

Referring to FIG. 3, the LCOS 14 is functionally connected to a controller 20 and configured to receive collimated light rays 24 and selectively allow some of the light rays to pass through a certain pixel or pixel cells 22 of the LCOS 14, to be cast on each of the CCDs 6, 8, 10. For the camera 2 to function correctly, the CCDs 6, 8, 10 must be aligned correctly, e.g., a light beam entering the camera 2 must be cast at the same position on all of the CCDs. For example, if a light beam which enters the camera 2 through the LCOS 14, hits the pixel cell disposed at row 501 column 732 on the red color channel CCD 6, the light beam should also hit the pixel cell disposed at row 501 column 732 on the green color channel CCD 8 or the blue color channel CCD 10. As all other pixel cells surrounding pixel cell disposed at row 501 column 732 are not exposed to an incoming light beam, they are disposed at a uniform exposure value while the pixel cell disposed at row 501 column 732 holds a distinct exposure value which would be considered a feature capable to be isolated by a feature detection routine operating on controller 20 or another controller functionally connected to the CCDs. Electronically, the contents of these non-exposed pixel cells are represented by a constant value representing a non-exposed pixel cell, thereby facilitating data processing or computations involved in frame-differencing. Therefore, a feature is a pixel that holds a value corresponding to a pixel that has been partially exposed. In the embodiment shown, a linear polarizer 38 is disposed between the incoming light rays 24 and the LCOS 14. A polarizer is an optical device useful for selectively transmitting or blocking light waves based on their orientation or polarization. As used herein, the controller 20 is any controller configured for controlling the per pixel level of an LCOS, microelectromechanical systems (MEMS) mirrors or any devices in which the transmissivity or reflectivity of the devices can be altered or controlled at a pixel level and the duration in which a pixel is disposed in a certain transmissivity or reflectivity can be controlled at a pixel level. Further, this controller can be the same controller that is already configured to control the CCDs 6, 8, 10 or it can be a separately-available controller having the benefit of access to integration time settings of the corresponding image sensor such that the controller may control the LCOS or MEMS mirrors according to these settings. In one embodiment, LCOS 14 includes a pixel plane including a single layer of pixel cells. The pixel plane of LCOS 14 is configured to be optically aligned with the pixel plane of the CCDs 6, 8, 10 to result in an optical mapping of the single layer of pixel cells of the pixel plane of the CCDs 6, 8, 10. In other words, each pixel of the LCOS 14 is aligned with a corresponding pixel of the CCDs 6, 8, and 10 such that light rays passing through a given pixel of the LCOS 14 will strike only the corresponding pixel of each CCD. The linear polarizer 4 is configured for polarizing light rays 20 of a light source to result in polarized light rays. A linear polarizer is unnecessary if the light rays have been polarized, e.g., those outputs emanating from an extended reality XR device. LCOS 14 is controlled at a pixel level using the controller 20 to control the integration setting, e.g., integration time, per pixel of the CCDs 6, 8, 10. The integration time of a pixel of a CCD sensor refers to the duration during which the pixel collects and accumulates light to capture an image and can be in the order of microseconds (µs), milliseconds (ms) or even seconds(s). Therefore, the integration time is a crucial parameter as it determines the amount of light the pixel can capture and, in turn, affects the exposure and image quality. The amount of light captured by the pixel is then converted into a digital value using an Analog-To-Digital (ADC) converter to result in a value that is different from unexposed pixel cells. Therefore, a first pattern formed at LCOS 14 determines a second pattern that would be received at each CCD 6, 8, 10. The first pattern obtained as a first frame by a controller, e.g., controller 20, is then compared or frame-differenced with a second pattern obtained as a second frame by the same controller to result in a differencing result to determine whether an exposed pixel at a CCD 6, 8, 10 matches the corresponding position of the transmitting or reflecting pixel at LCOS 14. In one embodiment, a frame-differencing process compares the position of a pixel on LCOS 14 controlled to transmit or reflect a light beam to the position of a pixel on a CCD 6, 8, 10 that has a value that significantly departs from the value of its neighboring pixel cells. The process useful for aligning the CCDs of a 3CCD camera with a transmissive LCOS, can be applied to the same camera using a reflective LCOS or MEMS mirrors 16 as shown in FIG. 4. In the case where a reflective LCOS is used, a beam splitter 18 is positioned between the reflective LCOS 16 and the camera 2 such that collimated light rays 24 directed towards the beam splitter 18 is first reflected onto the reflective LCOS 16 as an incident light beam 26. Again, one or more pixel cells 22 of the reflective LCOS 16 is programmed to be disposed in a setting to at least partially reflect the incident light beam 26 that hits the pixel cell 22 before some of the rays of this incident light beam 26 are reflected by the pixel cell 22 as a reflected light beam 28 directed towards the camera 2 to cast a light beam on each of the CCDs 6, 8, 10.

Figure 5:
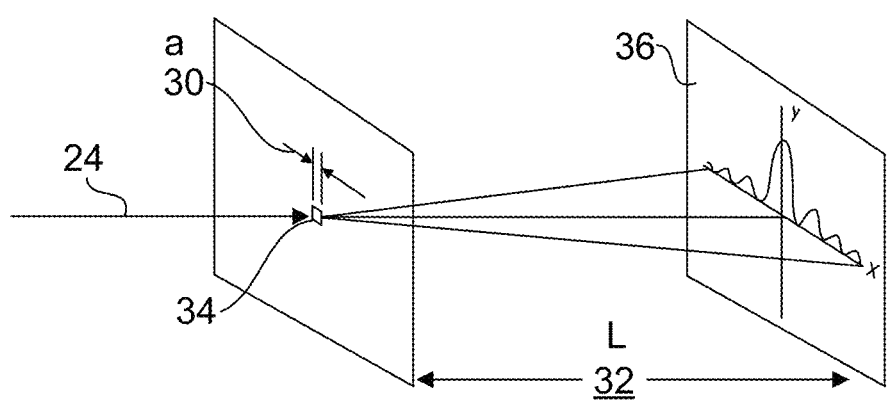
FIG. 5 is a diagram depicting diffractions that occur when light rays are disposed through a slit or aperture.

FIG. 5 is a diagram depicting diffractions that occur when light rays are disposed through a slit or aperture 34. Under a far field diffraction condition as shown in FIG. 5, L must be greater than $(a^2/\lambda)$, where a=aperture size 30 of an LCOS pixel cell, lambda=wavelength or light rays, L=aperture to detector or CCD distance 32, a desirable spot size on the detector or CCD plane may be detected although a light beam broadens when disposed through an aperture or pixel cell of an LCOS. Note the intensity distribution of the diffracted beam at screen 36. Unlike a lens or lens system which has a narrow depth of focus, the Z-range or the range in which to use a beam spot generated as a result of diffraction or reflection on the detector or CCD is wide.

Figure 6:
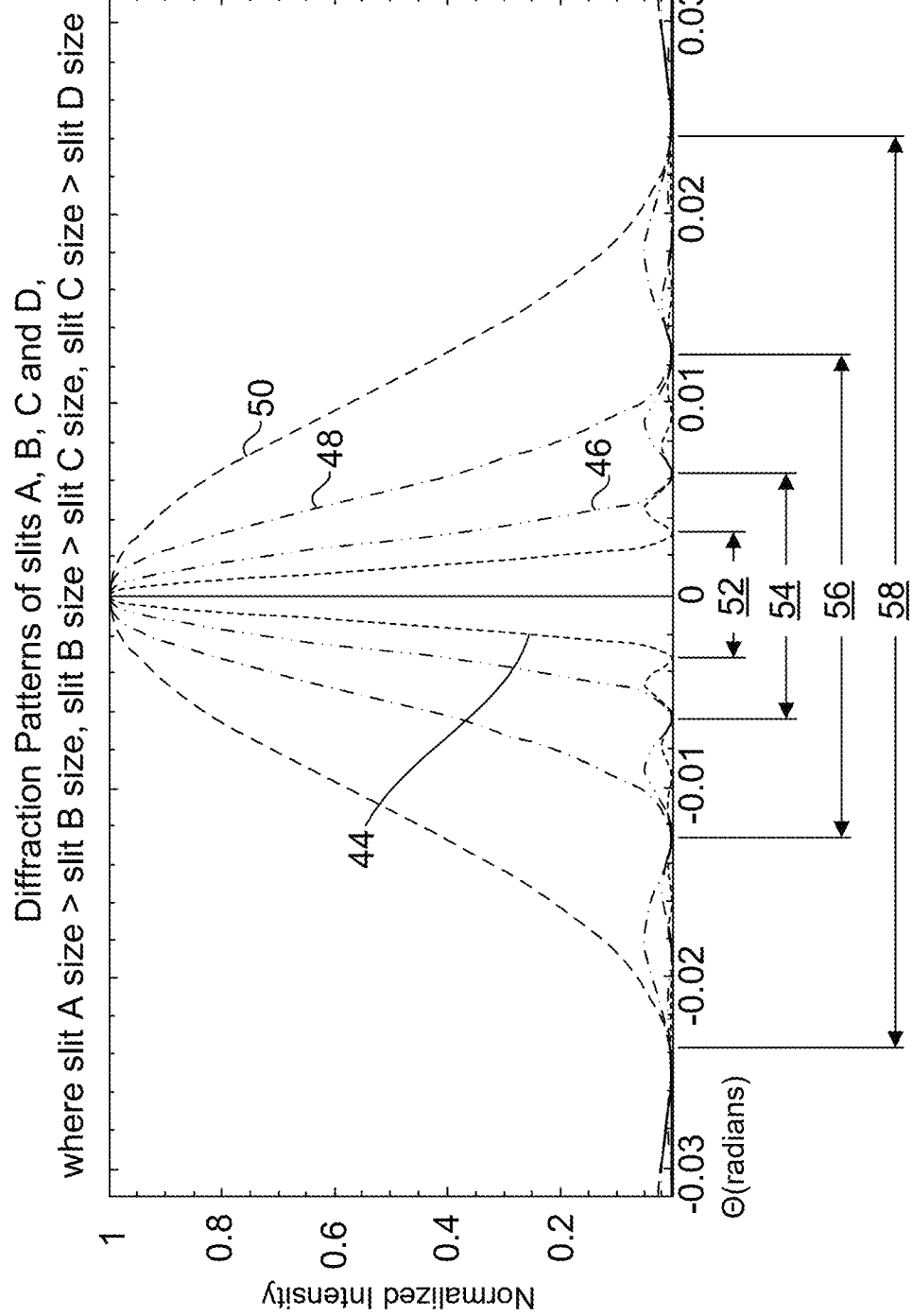
FIG. 6 is a diagram depicting diffraction patterns with respect to aperture sizes.

FIG. 6 is a diagram depicting diffraction patterns with respect to aperture sizes. It shall be noted that the width of the beam cast through an aperture is inversely proportional to the size of the aperture. In other words, the larger the aperture size, the narrower the beam becomes. As an example, the diffraction patterns 44, 46, 48, 50 of four slits of different sizes are shown where slit A is larger than slit B, slit B is larger than slit C and slit C is larger than slit D. It shall be noted that the width 52 of diffraction pattern 44 of slit A is less than the width 54 of diffraction pattern 46 of slit B, the width 54 of diffraction pattern 46 of slit B is less than the width 56 of diffraction pattern 48 of slit C, the width 56 of diffraction pattern 48 of slit C is less than the width 58 of diffraction pattern 50 of slit D. Therefore, it can be concluded that LCOS of lower resolutions, i.e., those with larger pixel cells and less costly to procure, can be used to cast one or more beams that fit into individual pixel cells. In one embodiment, the LCOS has 1080p or 1920×1080 resolution with pixel cells having large widths. An LCOS of this resolution is widely used and therefore is easily available and inexpensive to procure.

Figure 7:
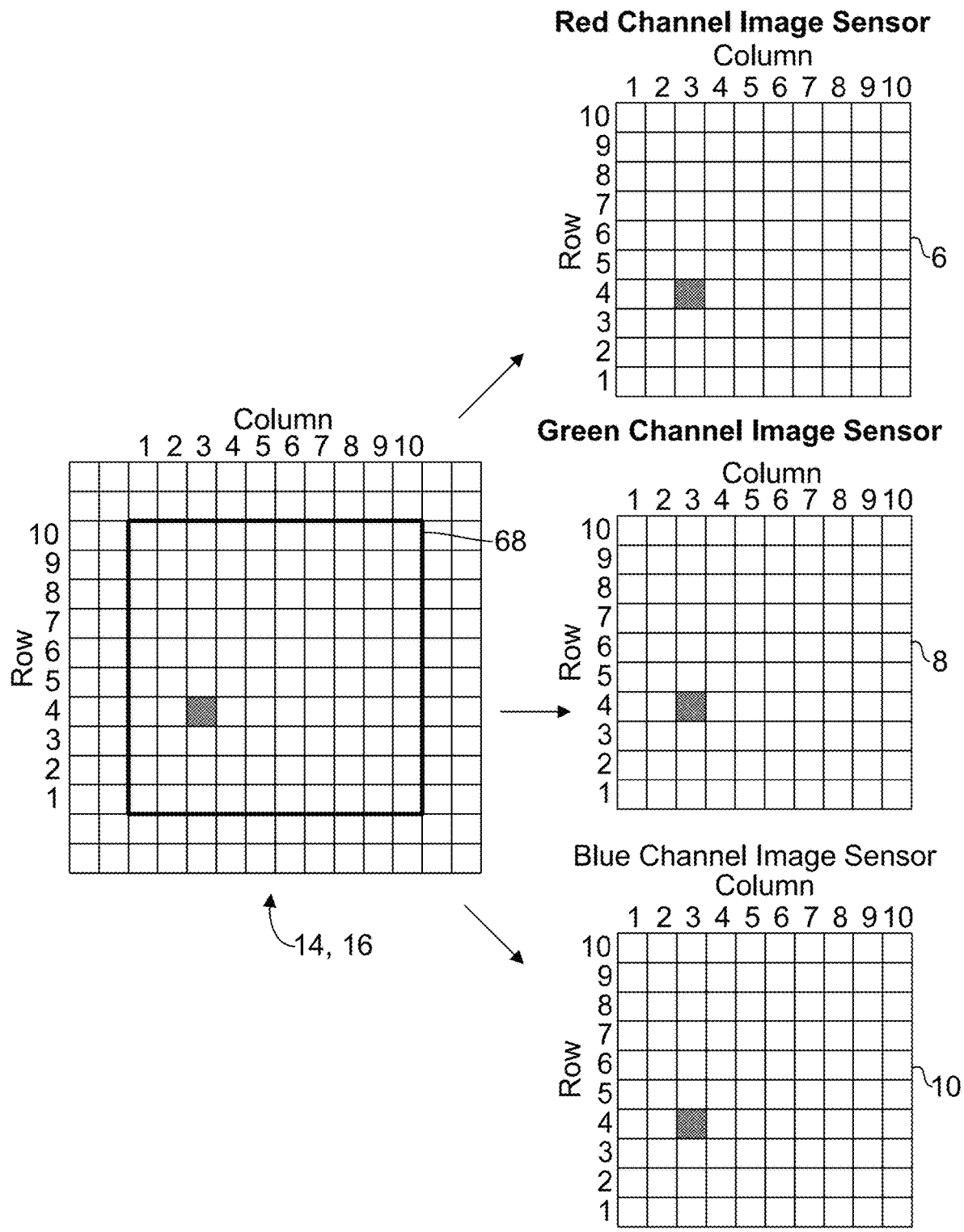
FIGS. 7-10 is a series of diagrams depicting various statuses of alignment of a liquid crystal on silicon (LCOS) with the CCDs of a 3CCD camera.

FIGS. 7-10 is a series of diagrams depicting various statuses of alignment of an LCOS with the CCDs 6, 8, 10 of a 3CCD camera 2. In reality, the pixel plane of an LCOS or a CCD can have a large number of pixel cells. However, for the sake of simplicity and for ease in describing the present process of aligning the CCDs 6, 8, 10, a pixel plane is shown herein as a 10×10 pixel plane, i.e., ten rows by ten columns of pixel cells. It shall also be noted that the size of the LCOS does not need to match the size of each CCD. Ideally, the LCOS shall at least have as many rows and columns as each CCD such that light beams can be cast through the LCOS on any pixel cell. Note that the LCOS can have more rows and columns than a CCD as long as an area of the LCOS can be configured to match the rows and columns of a CCD pixel plane. FIG. 7 shows a light beam that is cast through an LCOS to form a spot at position row 4 column 3 on each of the CCDs 6, 8, 10. No positional or orientational adjustments of the CCDs 6, 8, 10 are necessary as a light beam is cast through the LCOS on the CCDs at the same position of each device. Confirmation of the alignment of the devices can be made upon repeating one or more verification tests on one or more different spots.

Figure 8:
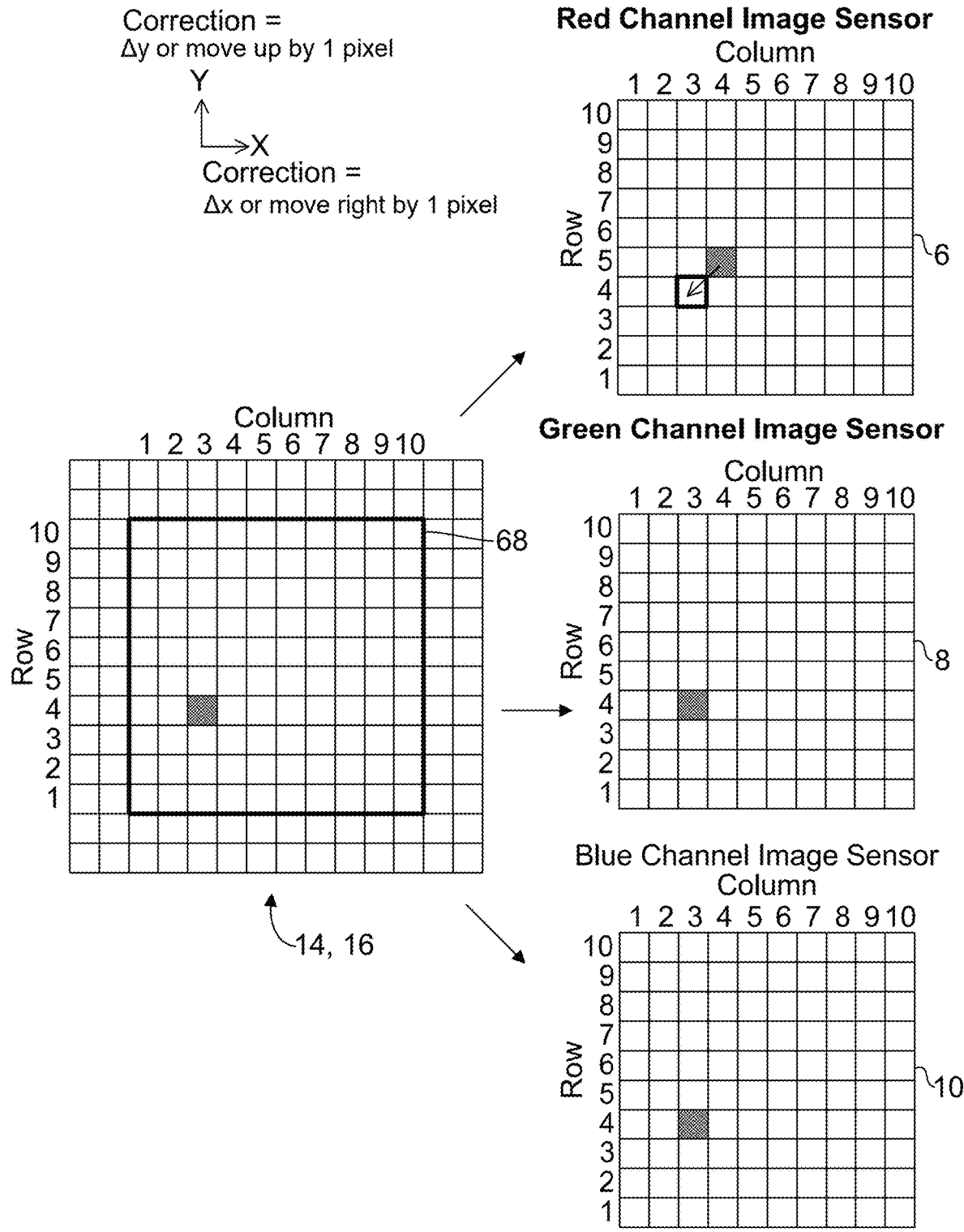

Referring to FIG. 8, in some cases, especially when it can be ascertained that CCDs 6, 8, 10 are orientationally aligned, only one light beam can be used to detect a misalignment that can be corrected with only a translation. Here, the red color channel CCD has been detected to be misaligned as the cast spot is at row 5 column 4 instead of row 4 column 3. A frame-differencing process between the pixel plane of the red color channel CCD with the pixel plane of the LCOS would yield a differencing result that is non-zero, i.e., the position of the feature or spot of the red color channel CCD is determined to be different from the position of the LCOS pixel cell controlled to yield the spots shown in the other pixel planes, i.e., those of the green and blue channel CCDs. The positional error can be corrected by moving the pixel plane of the red color channel CCD up by the distance of the height of a pixel cell and by moving the pixel plane of the red color channel CCD to the right by the distance of the width of a pixel cell. In one embodiment, the LCOS is a transmissive LCOS, the LCOS includes a plurality of rows and a plurality of columns of pixel cells, the first pattern corresponds to a pattern of transmissivity of the pixel cells of the LCOS. In another embodiment, the LCOS is a reflective LCOS, the LCOS includes a plurality of rows and a plurality of columns of pixel cells, the first pattern corresponds to a pattern of reflectivity of the pixel cells of the LCOS. As two of the pixel cells, i.e., cells at row 4 column 3 and row 5 column 9 of the LCOS are disposed in a transmissivity or reflectivity that is different from the transmissivity or reflectivity of the rest of the pixel cells of the LCOS, a frame-differencing process starts by picking out the cast spots on the CCDs 6, 8, 10 having a level of light intensity that are drastically different, e.g., an intensity value difference of at least 100 in an 8-bit image. The position of each spot is determined based on the distances expressed, e.g., in the number of pixel cells, from two edges of the frame 68 disposed at a right angle. In order to distinguish one spot from another, the spots are formed of different intensities such that each spot can be identified. For instance, if a light beam with a higher intensity is cast at spot 66 and a light beam with a lower intensity is cast at spot 64, the spot that appears disposed at the higher intensity is attributed to the pixel cell at row 4 column 3 and the other spot is attributed to the pixel cell at row 5 column 9 of the LCOS.

Figure 9:
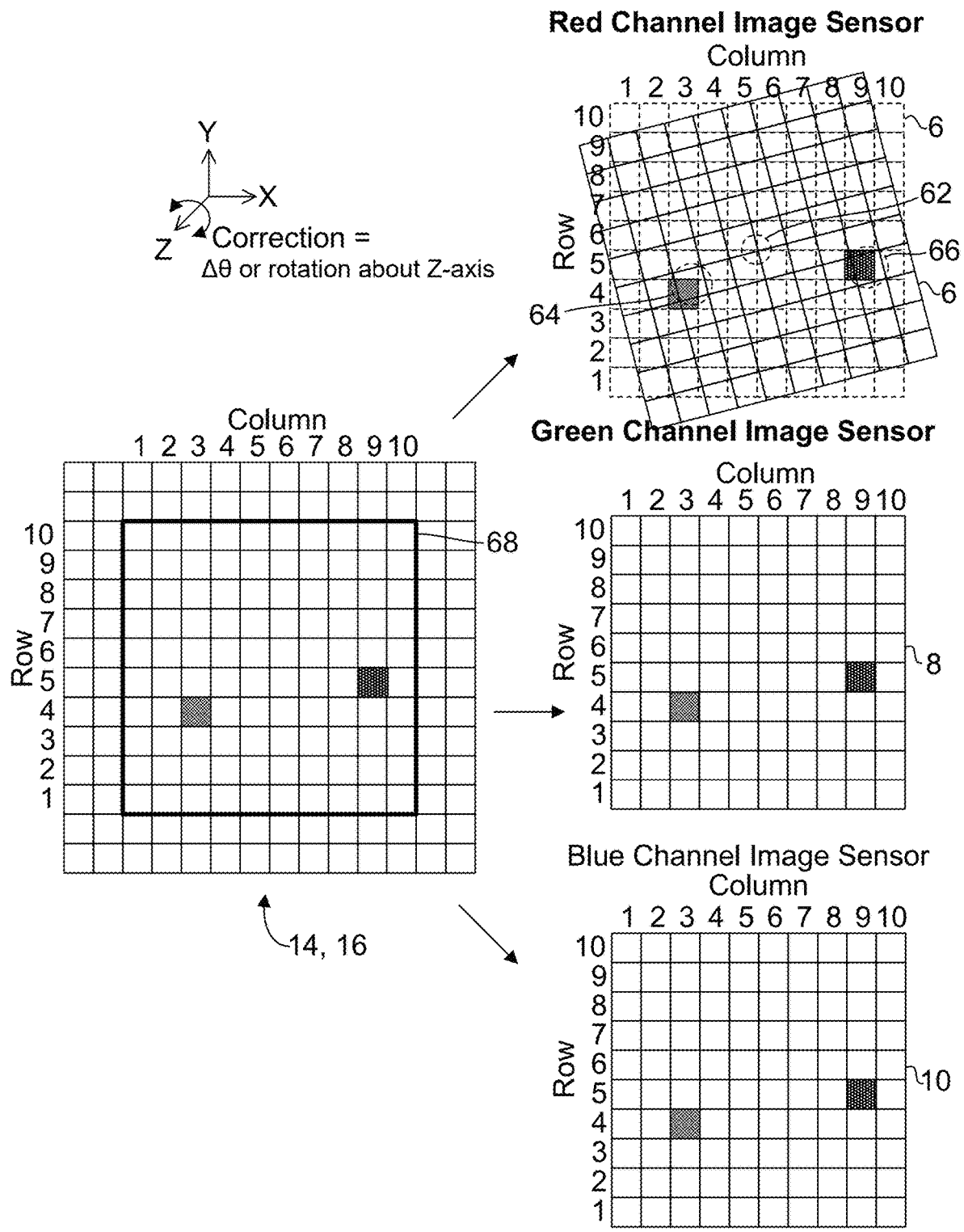

Referring to FIG. 9, it shall be noted that in this example, instead of casting only one spot, two spots are cast and at different levels of transmissivity if a transmissive LCOS is used or at different levels of modulation state or reflectivity if a reflective LCOS is used. The frame shown in dash lines, represents the frame with the desired position and orientation. It shall be noted that, by casting more than one target spot, e.g., a first target spot at row 4 column 3 and a second target spot at row 5 column 9, a deviation in orientation about the Z-axis can be immediately discerned as the first spot 64 of the misaligned frame appears to occupy mostly the pixel cell at row 5 column 3 and the second spot 66 of the misaligned frame appears to occupy mostly the pixel cell at row 4 column 9. As the position of each spot relative to the current frame is known, a slope can be readily calculated. This slope is compared to the desired slope formed between the first spot and second spot on the CCD frame with the correct position and orientation to result in an angle and direction of rotation required to correct the orientation of the misaligned frame first. Further, as the spots may be cast at different levels of intensity, e.g., by disposing the pixel cells involved at different levels of transmissivity or reflectivity, the identity of the multiple spots can be ascertained so that the spots can be distinguished from one another. Upon achieving the desired orientation about the Z-axis by rotating the CCD frame about the central axis 62 of the misaligned CCD frame that is coaxially disposed with the central axis of the desired CCD frame, any required corrections along the X and Y-axes are then computed and carried out. In this example, upon correcting the discrepancy in orientation about the Z-axis, no corrections along the X and Y-axes are needed.

Figure 10:
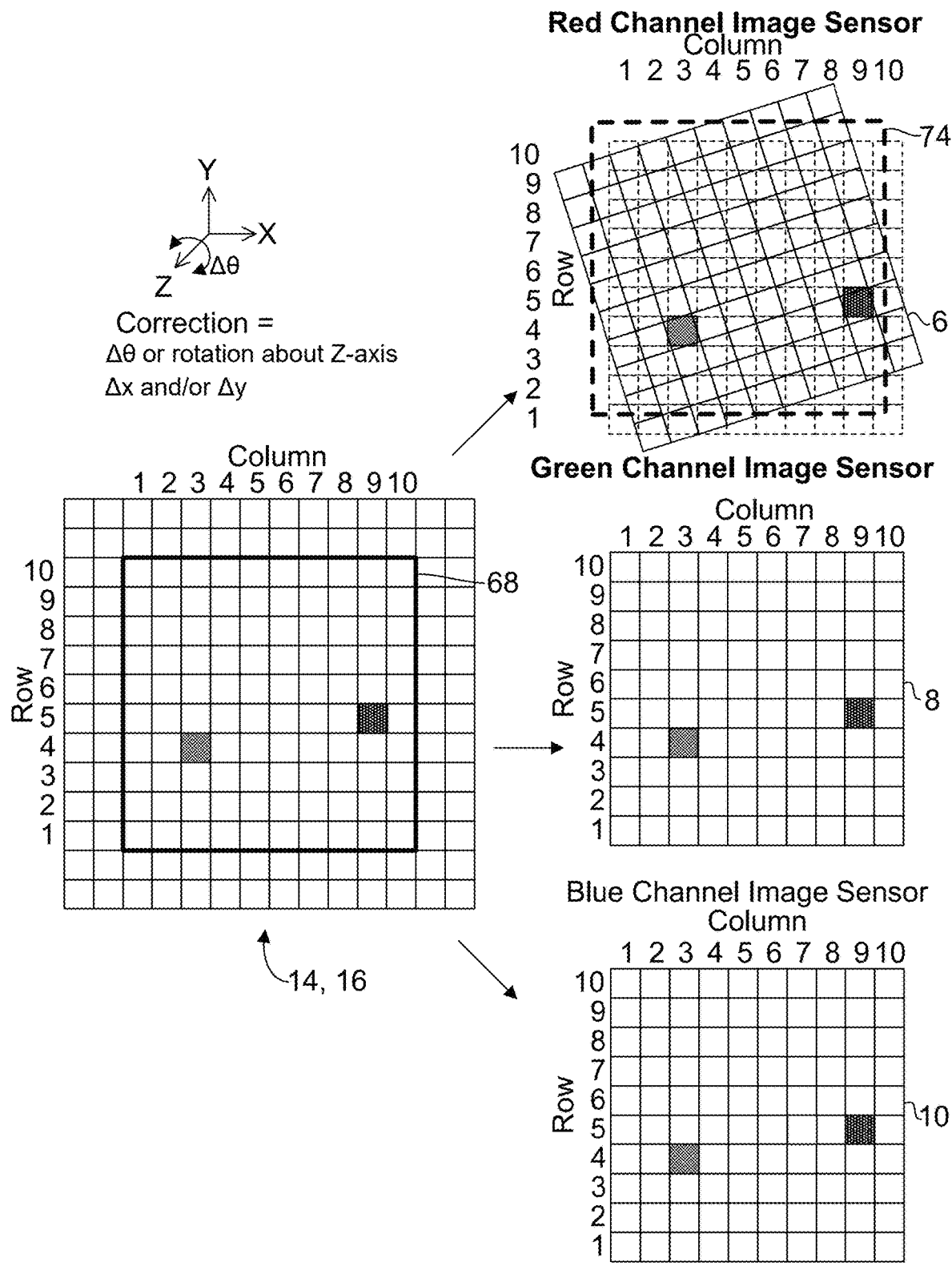

Referring to FIG. 10, it shall be noted that the misalignment of the red color channel CCD includes an orientation component that is similar to the misorientation of the red color channel CCD shown in FIG. 9. It shall be noted that an orientation correction is required as a line disposed through the two spots 70, 72 is disposed at a slope relative to its misaligned frame, that is different from the slope of the two spots 70, 72 relative to a target frame. However, upon a corrective rotation of the frame about a central axis of the misaligned frame, the resulting frame 74 still does not match the target frame. Therefore, a corrective translation of the frame 74 along the X and Y-axes, is still required for the frame 74 to match the target frame. In general, if more than one spot is desired for use in the misalignment detection, correction and verification of the correction, the spots shall be spread as far apart from one another to allow the most detectable discrepancy in alignment. In other words, the greater the distance between two spots, the more apparent a misalignment of a CCD frame becomes. It is advisable to avoid using spots that are too close to the edges, such as those less than five pixel cells from a frame edge. If a spot is too close to a frame edge, a misalignment of a frame may cause the spot to lay outside of a CCD frame and there will be insufficient data to determine the translation and/or orientation corrections that are required. A CCD frame is typically provided in a rectangular shape. The use of even more spots can also help verify the match of an LCOS frame and a CCD frame. However, with more spots, increased computations will be required to verify the position and orientation of each CCD frame. Each CCD frame includes a plurality of rows of pixel cells in a first dimension and a plurality of columns of pixel cells in a second dimension. If the spread is limited to a magnitude or distance corresponding to the shorter of the two dimensions, the likelihood of a spot falling outside of a CCD frame is significantly reduced, particularly in cases where a CCD is severely misaligned prior to the detection of the misalignment and the application of corrective measures. For example, if a CCD frame has 1500 rows and 2000 columns, the spread between two cast spots may be limited to 1500 pixel cell widths to reduce the possibility that at least one of the cast spots may not be observed.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A method for verifying alignment of a plurality of image sensors of a charge-coupled device (CCD) camera using a liquid crystal on silicon (LCOS), the LCOS comprising a pixel plane, wherein the pixel plane of the LCOS optically maps to a pixel plane of each of the plurality of image sensors, said method comprising:
   (a) casting a collimated light source through the LCOS controlled to be disposed in a first pattern, onto the plurality of image sensors to form a second pattern on each of the plurality of image sensors, the LCOS disposed between the collimated light source and the CCD camera;
   (b) frame-differencing said first pattern with said second pattern of each of the plurality of image sensors to result in a differencing result for each of the plurality of image sensors; and
   (c) adjusting at least one of an orientation and a position of an image sensor of the plurality of image sensors if the differencing result for the image sensor of the plurality of image sensors is non-zero, to result in an optical mapping of the pixel plane of the LCOS and the pixel plane of each of the plurality of image sensors of the CCD camera.

2. The method of claim 1, wherein the LCOS is a transmissive LCOS, the transmissive LCOS comprising a plurality of rows and a plurality of columns of pixel cells, said first pattern corresponds to a pattern of transmissivity of the pixel cells of the transmissive LCOS and at least two of the pixel cells of the transmissive LCOS are disposed in a transmissivity that is different from the transmissivity of the rest of the pixel cells of the transmissive LCOS.

3. The method of claim 2, wherein the at least two of the pixel cells of the transmissive LCOS are disposed at different levels of transmissivity.

4. The method of claim 2, wherein the at least two of the pixel cells of the transmissive LCOS are separated up to a distance corresponding to the shorter of a first dimension of the plurality of rows of pixel cells and a second dimension of the plurality of columns of pixel cells.

5. The method of claim 1, wherein the LCOS is a reflective LCOS, the reflective LCOS comprising a plurality of rows and a plurality of columns of pixel cells, said first pattern corresponds to a pattern of reflectivity of the pixel cells of the reflective LCOS and at least two of the pixel cells of the reflective LCOS are disposed in a reflectivity that is different from the reflectivity of the rest of the pixel cells of the reflective LCOS.

6. The method of claim 5, wherein the at least two of the pixel cells of the reflective LCOS are disposed at different levels of reflectivity.

7. The method of claim 5, wherein the at least two of the pixel cells of the reflective LCOS are separated up to a distance corresponding to the shorter of a first dimension of the plurality of rows of pixel cells and a second dimension of the plurality of columns of pixel cells.

8. The method of claim 1, wherein the LCOS comprises a resolution of 1080p.

9. A method for verifying alignment of a plurality of image sensors of a charge-coupled device (CCD) camera using a liquid crystal on silicon (LCOS), the LCOS comprising a pixel plane comprising a plurality of rows and a plurality of columns of pixel cells, wherein the pixel plane of the LCOS optically maps to a pixel plane of each of the plurality of image sensors, said method comprising:
   (a) casting a collimated light source through the LCOS controlled to be disposed in a first pattern, onto the plurality of image sensors to form a second pattern on each of the plurality of image sensors, the LCOS disposed between the collimated light source and the CCD camera, wherein at least two of the pixel cells of the LCOS are disposed in a modulation state that is different from the modulation state of the rest of the pixel cells of the LCOS;

(b) frame-differencing said first pattern with said second pattern of each of the plurality of image sensors to result in a differencing result for each of the plurality of image sensors; and (c) adjusting at least one of an orientation and a position of an image sensor of the plurality of image sensors if the differencing result for the image sensor of the plurality of image sensors is non-zero, to result in an optical mapping of the pixel plane of the LCOS and the pixel plane of each of the plurality of image sensors of the CCD camera.

10. The method of claim 9, wherein the LCOS is a transmissive LCOS.

11. The method of claim 10, wherein the at least two of the pixel cells of the transmissive LCOS are disposed at different levels of transmissivity.

12. The method of claim 10, wherein the at least two of the pixel cells of the transmissive LCOS are separated up to a distance corresponding to the shorter of a first dimension of the plurality of rows of pixel cells of the transmissive LCOS and a second dimension of the plurality of columns of pixel cells of the transmissive LCOS.

13. The method of claim 9, wherein the LCOS is a reflective LCOS.

14. The method of claim 13, wherein the at least two of the pixel cells of the reflective LCOS are disposed at different levels of reflectivity.

15. The method of claim 13, wherein the at least two of the pixel cells of the reflective LCOS are separated up to a distance corresponding to the shorter of a first dimension of the plurality of rows of pixel cells of the reflective LCOS and a second dimension of the plurality of columns of pixel cells of the reflective LCOS.

16. The method of claim 9, wherein the LCOS comprises a resolution of 1080p.

\* \* \* \* \*